(12) United States Patent
Dalstein et al.

(10) Patent No.: US 10,482,646 B1
(45) Date of Patent: Nov. 19, 2019

(54) DIRECTABLE CLOTH ANIMATION

(71) Applicant: Pixar, Emeryville, CA (US)

(72) Inventors: Boris Dalstein, Emeryville, CA (US); Kurt Fleischer, Emeryville, CA (US)

(73) Assignee: Pixar, Emeryville, CA (US)

( * ) Notice: Subject to any disclaimer, the term of this patent is extended or adjusted under 35 U.S.C. 154(b) by 68 days.

(21) Appl. No.: 15/648,366

(22) Filed: Jul. 12, 2017

Related U.S. Application Data

(60) Provisional application No. 62/365,244, filed on Jul. 21, 2016.

(51) Int. Cl.
  *G06T 13/40* (2011.01)
  *G06T 17/20* (2006.01)
  *G06T 19/20* (2011.01)

(52) U.S. Cl.
  CPC .............. *G06T 13/40* (2013.01); *G06T 17/20* (2013.01); *G06T 19/20* (2013.01); *G06T 2200/24* (2013.01); *G06T 2210/16* (2013.01)

(58) Field of Classification Search
  CPC ...... G06T 2210/16; G06T 13/40; G06T 19/20
  See application file for complete search history.

(56) References Cited

U.S. PATENT DOCUMENTS

| | | | | |
|---|---|---|---|---|
| 5,835,693 | A * | 11/1998 | Lynch | B25J 9/1605 345/473 |
| 6,219,032 | B1 * | 4/2001 | Rosenberg | A63F 13/06 345/157 |
| 2007/0247465 | A1 * | 10/2007 | Hadap | G06T 13/20 345/473 |
| 2008/0297519 | A1 * | 12/2008 | Scapel | G06T 13/40 345/474 |
| 2011/0298827 | A1 * | 12/2011 | Perez | G06K 9/00355 345/647 |
| 2014/0032180 | A1 * | 1/2014 | Kim | G06F 17/5018 703/1 |
| 2015/0130795 | A1 * | 5/2015 | Chhugani | G06T 19/20 345/419 |
| 2016/0180559 | A1 * | 6/2016 | Karpenko | H04N 5/23248 382/284 |
| 2016/0278754 | A1 * | 9/2016 | Todorov | A61B 17/025 |

OTHER PUBLICATIONS

M. Keckeisen, S. L. Stoev, M. Feurer, and W. Staßer. Interactive Cloth Simulation in Virtual Environments. In Proceedings of IEEE VR 2003, 2003. (Year: 2003).*

* cited by examiner

*Primary Examiner* — Grace Q Li

(74) *Attorney, Agent, or Firm* — Kilpatrick Townsend & Stockton LLP

(57) ABSTRACT

One aspect of the present disclosure is directed to enabling a user to specify one or more forces to influence how a movable object carried by a 3D character may move during an animation sequence of the 3D character. In some embodiments, the user input can include an arrow. The user can be enabled manipulate the arrow to specify values for at least one parameter of the force to be applied to the movable object during the animation sequence. Another aspect of the disclosure is directed to enabling the user to draw a silhouette stroke to direct an animation of the movable object during the animation sequence. The silhouette stroke drawn by the user can be used as a "boundary" towards which the movable object may be "pulled" during the animation sequence. This may involve generating forces according to the position where the silhouette stroke is drawn.

17 Claims, 11 Drawing Sheets

Time: T

Time: T+1

DIRECTABLE CLOTH ANIMATION

CROSS-REFERENCES TO RELATED APPLICATIONS

This Application claims priority to U.S. Provisional Patent Application No. 62/365,244, filed Jul. 21, 2016 and entitled "DIRECTABLE CLOTH ANIMATION", the entire disclosure of which are hereby incorporated by referenced for all purposes.

BACKGROUND

This disclosure relates to computer-generated imagery (CGI) and computer-aided animation. More specifically, this disclosure relates to techniques for preserving the shape of simulated and dynamic objects for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, create lighting, coloring and paint, or the like, of characters or other elements of a computer animation display.

One core functional aspect of animation is the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. The geometric description of the objects may include a number of animation control variables (avars) and values for the avars. In some instances, an animator may also pose the objects within the image or sequence and specify motions and positions of the objects over time to create an animation. In other instances, motions and positions of some objects, such as hair, clothing, and plants are usually too complex for a human animator to directly control at every stage of a computer animation. Instead, the human animator specifies the physics and/or physical properties of one or more dynamic or simulated objects. A computer program then employs physically-based numerical methods and techniques to simulate the motions and positions of these objects over time based on the physics or physical properties of the individual objects.

For simulated clothing objects, for example, the animator specifies the physical properties and construction of the cloth. For example, the animator specifies how the cloth bends due to forces or collisions with solid objects. The animator further specifies how the cloth deforms or collides with itself. Moreover, the animator specifies external forces that act on the cloth, such as gravity and wind.

In addition to modeling the physical properties of the simulated objects, the animator specifies motions and positions of kinematic or non-simulated objects (e.g., characters upon which the clothing objects rest). The animation of a non-simulated object generally is independent of and otherwise unaffected by motions and positions of simulated objects. However, the motions and positions of the non-simulated objects often are the principal influencer of motions and positions of simulated objects, as clothing and hair are likely to be associated with a kinematic character.

Consider a computer animation of a human character standing upright, wearing a jacket. The human character is a kinematic or non-simulated object that is directly animated by the skilled human animator. The animator specifies the physics (e.g., the physical properties) of the jacket which is a simulated object. In addition, the animator models how the jacket is associated with and worn by the human character. During simulation, the computer program simulates the motions and positions of the jacket using physically-based numerical techniques in response to external forces and the motions and positions of the human character.

If the physical properties and external forces acting on a simulated object are accurately modeled, the resulting motion of the simulated object will be plausible and seemingly realistic. In the jacket example, the cloth of the jacket should hang down and fold naturally. Furthermore, the cloth should react according to the motions and positions of the human character when the human character wears the jacket. However, modeling the simulated objects to be truly accurate is a delicate balance between the limitations and complexities of the animator's knowledge of physics and particle systems on the one hand and budgetary and time constraints on the other.

BRIEF SUMMARY OF THE INVENTION

In accordance with the disclosure, various embodiments enable a user to provide a user input to direct animation (e.g., simulating the movement of) a movable object (e.g., a piece of cloth worn by a 3D character, or hair of the 3D character) during an animation sequence of a 3D character that carries the movable object. In those embodiments, the user input can specify a total force to be applied to the movable object during an animation sequence of the 3D character. For animating the 3D character, the force as specified by the user input can be generated to "influence" the movement of the movable object during the simulation of the animation sequence of the 3D character, which may be referred to as the next simulation pass herein. In some embodiments, the generation of such a force can include selecting one or more vertices on the movable object based on distances between the vertices and user input drawn in an interface where the movable object is shown, and can include determining, for each selected vertex, an individual force to be applied to the selected vertex during the next simulation of the animation sequence of the 3D character. In some embodiments, the force generated according to user input can vary over time.

In some embodiments, the user input described above can include a drawing of an arrow by the user on a display. In some embodiments, the user may be enabled to draw a two-dimensional arrow. In some embodiments, a 3-D shape of the arrow drawn by the user may be determined by projecting the arrow onto an object it intersects, or when the arrow is drawn in an empty part of display. In some embodiments, the 3-D shape of the arrow can be determined by projecting the arrow onto a "canvas" object placed in the scene by the user. The user can be enabled to manipulate the arrow to specify values for at least one parameter of the force to be applied to the movable object during the next simulation pass. For example, the user may be enabled to draw a direction of the arrow to indicate the direction where the force is to "pull" the movable object during the next simulation pass. As another example, the user may be enabled to bend the arrow such that the forces generated for applying to selected vertices follow the shape of the arrow. Other examples of adjustable aspects of the arrow may include a length and/or a width of the arrow, which can be used to determine an area on the movable object that may be "influenced" by the force to be applied to the movable object. In some embodiments, the user specified arrow can be animated over time such that the position and shape of the arrow may change over the time. In those embodiments, parameters of the force as specified by the animated arrow can be interpolated based on the shape and position of the arrow.

In some embodiments, the user may be enabled to specify a subset of frames during which the movable object is to be "influenced" by the force specified by the above-described user input. In those embodiments, the force as specified by the above-described user input can be applied to the movable object, along with other force(s) during the frames in the subset during the next simulation pass. In some embodiments, the strength of the force specified by the user input may change to smoothly ramp the force on and off in the subset of frames.

In accordance with the disclosure, various embodiments can enable a user to draw a silhouette stroke to direct an animation of a movable object. For example, the moveable object may be a piece of clothing carried by a 3D character during an animation sequence of the 3D character. As another example, the movable object may be a piece of drapery on a static object, such as a piece of table cloth on a table, in an 3D animation sequence. The silhouette stroke drawn by the user can be used as a "boundary" towards which the movable object may be "pulled" during the animation sequence of the 3D character. This may involve generating forces according to the position where the silhouette stroke is drawn by the user with respect to the movable object. In some embodiments, the generation of such forces may include selecting vertices on the movable object based on the distances of the vertices to the silhouette stroke. For each selected vertex, a force (e.g., damped spring force) may be generated such that during the animation sequence of the 3D character, the vertex may be "pulled" towards the silhouette in accordance with the force. In some implementations, the user may be enabled to specify a subset of frames during which the movable object is to be "influenced" by the forces generated according to the silhouette drawn by the user as described above. In some embodiments, the user specified silhouette can be animated over time such that the curve of the silhouette may change over the time. In those embodiments, parameters of the force as specified the animated silhouette can be interpolated based on the curve of the silhouette.

Other embodiments are directed to systems and computer readable media associated with methods described herein.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
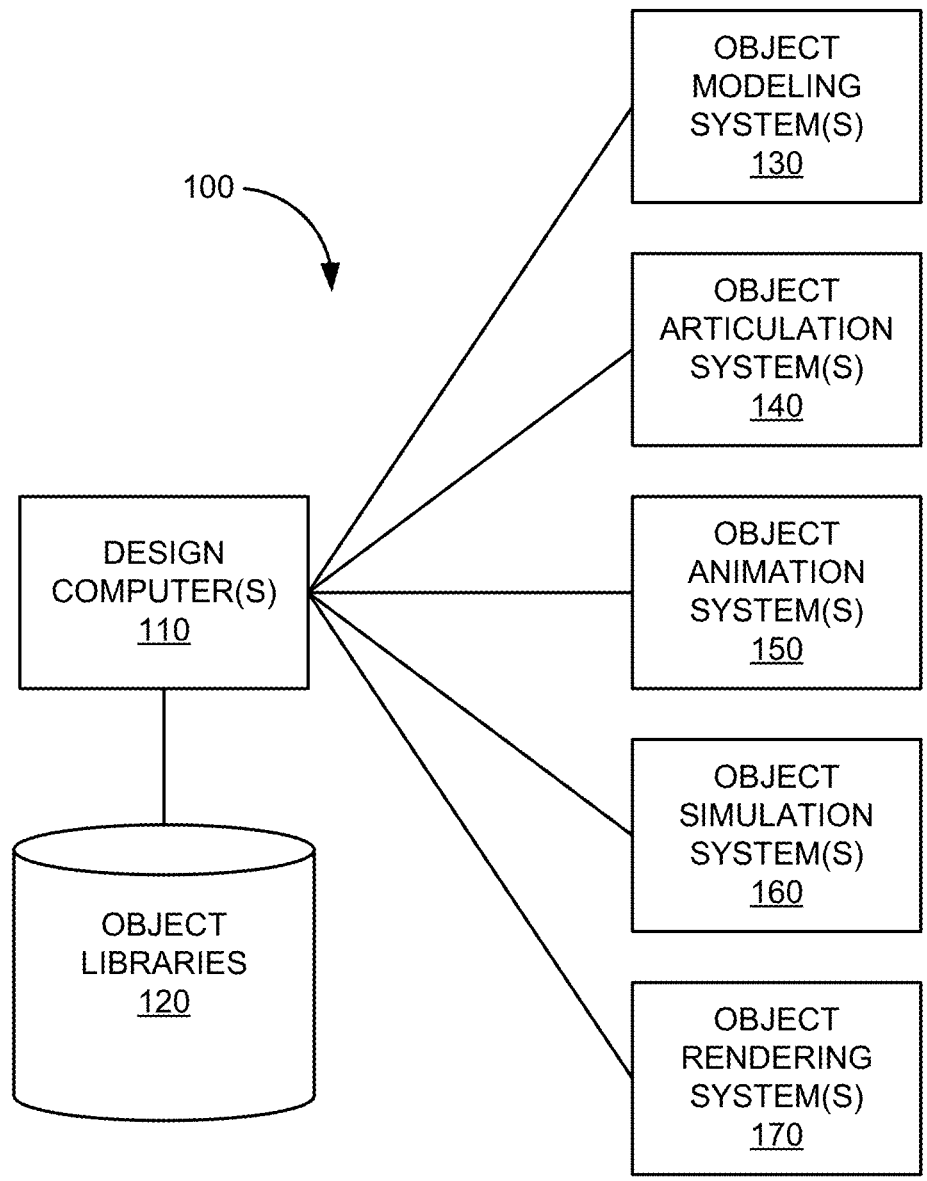
FIG. 1 is a simplified block diagram of system for creating computer graphics imagery (CGI) and computer-aided animation that may generate or incorporate various embodiments or techniques for enabling a user to direct a movement of a movable object carried by a 3D character during an animation sequence of the 3D character.

This disclosure relates to computer-generated imagery (CGI) and computer-aided animation. More specifically, this disclosure relates to techniques for directing movement an object for use in CGI and computer-aided animation.

In various embodiments, movable objects are elements of a computer animation display. The computer animation display may include movable objects (e.g., secondary or dynamic objects) carried by a 3D character, such as cloth, garments and clothing, hair, and fur of the 3D character. Typically, such movable objects are modeled, described, or represented by an animator as a collection of particles, connected to each other in some manner. During an animation sequence of the 3D character, a given movable object (e.g., a piece of garment worn by the 3D character) may be animated with various forces according to various simulated factors during the animation sequence of the 3D character, e.g., gravity, kinetic force from the movement of 3D character, collision of the movable object with other solid objects, wind, and/or any other factors. While these factors may be simulated by an animation engine to realistically simulate the movement of the given movable object, it is still desirable to enable a user (e.g., an animator) to direct a movement of the movable object during the animation sequence of the 3D character.

For example, a piece of a scarf worn by the 3D character may "fly" backwards "wildly" as the 3D character sprints forward during the animation sequence of the 3D character due to the speed of the 3D character. However, when the animation sequence of the 3D character is presented to an animator, the animator may desire to direct the movement of the scarf worn by the 3D character during the animation sequence. For instance, the animator may desire the scarf to move in a lesser degree and/or in a certain direction consistently during the animation sequence. That is, it is desirable to enable the animator to provide his/her input in a simple and straightforward manner to direct a movement of a movable object carried by the 3D character during the animation sequence of the 3D character.

In accordance with one aspect of the disclosure, various embodiments can enable a user to provide a user input to direct animation (e.g., simulating the movement of) a movable object (e.g., a piece of cloth worn by a 3D character, or hair of the 3D character) during an animation sequence of a 3D character that carries the movable object. In those embodiments, the user input can specify a total force to be applied to the movable object during an animation sequence of the 3D character. For animating the 3D character, the force as specified by the user input can be generated to "influence" the movement of the movable object during the simulation of the animation sequence of the 3D character, which may be referred to as the next simulation pass herein. In some embodiments, the generation of such a force can include selecting one or more vertices on the movable object, and can include determining, for each selected vertex, an individual force to be applied to the selected vertex during the next simulation of the animation sequence of the 3D character.

In accordance with another aspect of the disclosure, various embodiments can enable a user to draw a silhouette stroke to direct an animation of a movable object carried by a 3D character during an animation sequence of the 3D character. The silhouette stroke drawn by the user can be used as a "boundary" towards which the movable object may be "pulled" during the animation sequence of the 3D character. This may involve generating forces according to the position where the silhouette stroke is drawn by the user with respect to the movable object. In some embodiments, the generation of such forces may include selecting vertices on the movable object based on the distances of the vertices to the silhouette stroke. For each selected vertex, a force (e.g., damped spring force) may be generated such that during the animation sequence of the 3D character, the vertex may be "pulled" towards the silhouette in accordance with the force. In some implementations, the user may be enabled to specify a subset of frames during which the movable object is to be "influenced" by the forces generated according to the silhouette drawn by the user as described above.

I. Animation System

FIG. 1 is a simplified block diagram of system 100 for creating computer graphics imagery (CGI) and computer-aided animation that may generate or incorporate various embodiments or techniques for enabling a user to direct a movement of a movable object carried by a 3D character during an animation sequence of the 3D character. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more object animation systems 150 may be configured to enable users to manipulate controls or animation variables or utilized character rigging to specify one or more key frames of animation sequence. The one or more object animation systems 150 generate intermediary frames based on the one or more key frames. In some embodiments, the one or more object animation systems 150 may be configured to enable users to specify animation cues, paths, or the like according to one or more predefined sequences. The one or more object animation systems 150 generate frames of the animation based on the animation cues or paths. In further embodiments, the one or more object animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more animation computers 110, object library 120, the one or more object modeler systems 130, the one or more object articulation systems 140, the one or more object animation systems 150, the one or more object simulation systems 160, and/or the one or more object rendering systems 170 that provide one or more tools for preserving the shape of simulated and dynamic objects.

II. Force Application Mode

One aspect of the present disclosure is directed to enabling a user (e.g., an animator) to specify one or more forces to influence how a movable object (e.g., a piece of cloth) carried by a 3D character may move during an animation sequence of the 3D character. In various embodiments, an animation system, such as the system 100 described and illustrated herein may present a drawing tool to the user to enable the user to specify such a force. The user may be enabled to draw a stroke that may have some curvatures to specify the force. For example, the user may be enabled to interact with an input device to draw a directional line to specify such a force. The force specified by the user may be generated by the animation system (e.g., through the object animation system 150) to affect the movement of the movable object during the animation sequence of the 3D character.

In some embodiments, an interface is provided on a display. The interface may be configured to enable the user to draw a directional line on the display with respect to the movable object for directing the movement of the movable during the animation sequence of the 3D character in a manner consistent with the directional line. Based on the direction in which the user began to draw the line, the animation simulation system may generate an arrow. Specifically, the arrow may begin where the user began drawing the line and terminate where the user finished drawing the line. In those embodiments, values for various parameters of the force(s) that may be generated by an animation engine or may be determined from one or more aspects associated with the arrow, such as a direction, length, width, a degree of bend, and/or any other aspect.

A. Interface for Directing Movement of an Object

Figure 2:
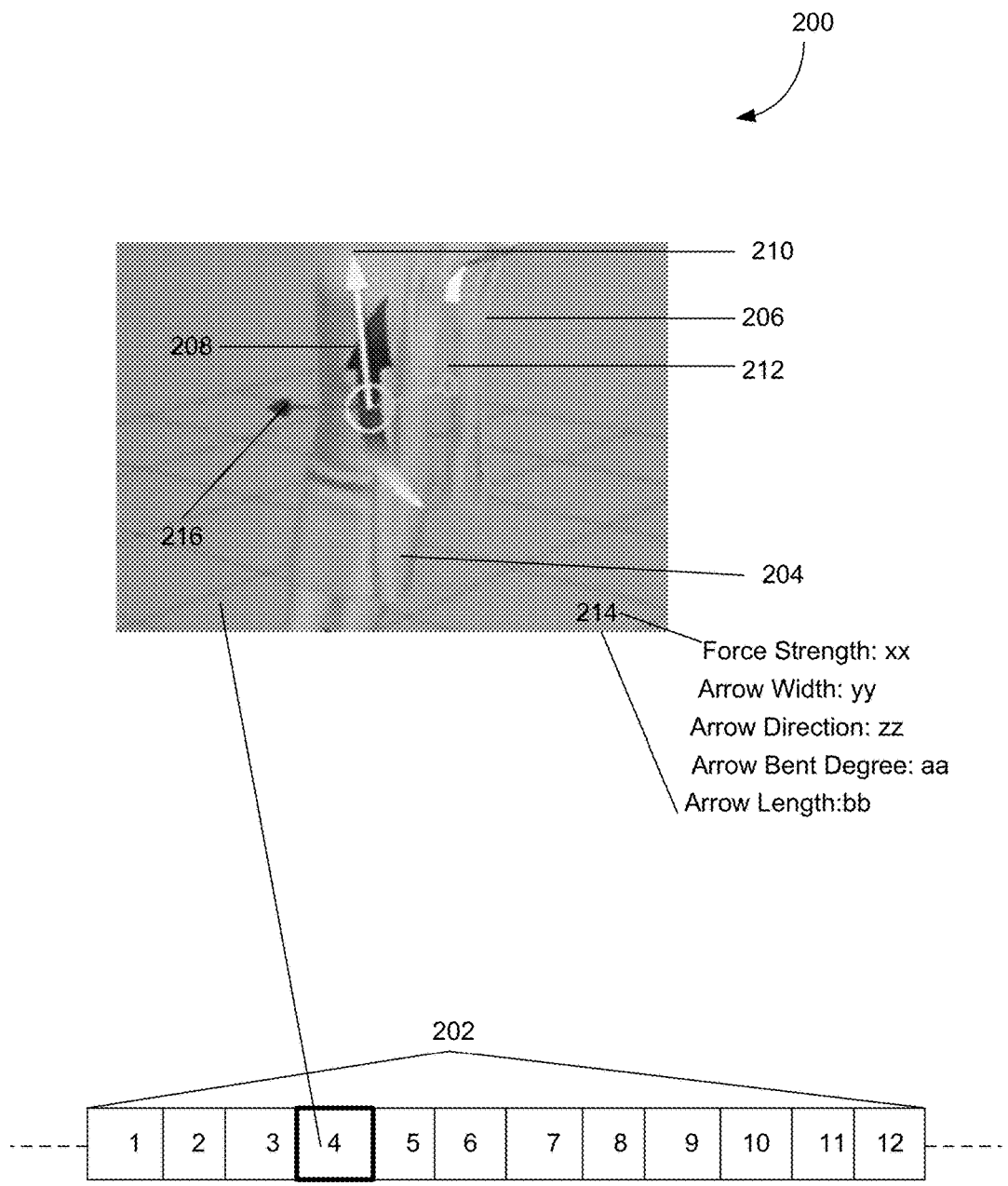
FIG. 2 illustrates an example interface that enables a user to specify a force for directing a movement of a movable object carried by a 3D character in accordance with the disclosure.

FIG. 2 illustrates an example interface 200 that enables a user to specify a force for directing a movement of a movable object 206 carried by a 3D character 204 in accordance with the disclosure. In various embodiments, the interface 200 shown in FIG. 2 may be generated by an animation system the same as or substantially similar to the system 100 described and illustrated herein.

The interface 200 may present a set of frames 202, such as frames 202-1 to 202-12 as shown in this example to the user. The set of frames 202 may represent an animation sequence of the 3D character 204. In this example, the 3D character 204 performs a squat motion such that the 3D character 204 bends her knees during the animation sequence. As described above, the animation sequence of the 3D character 204 as represented in the set of frames 202 may include a movement of the movable object 206, i.e., a piece of scarf in this example, simulated according to various factors such as one or more collisions during the animation sequence, gravity, kinetic motion of the 3D character 204 (i.e., squatting in this example), a particular wind condition when the 3D character 204 is performing the kinetic motion, and/or any other factors. It should be understood the movement of the movable object 206 in the animation sequence as represented in the set of frames 202 may have been simulated in accordance with user specified movement information previously provided through interface 200. For example, the animator may have already used interface 200 previously to direct the movement of the movable object 206 and the set of frames 202 were generated as a result of the direction by the animator.

As shown, the individual frames 202-1 to 202-12 may be presented to the user in a serial format such that the user may select them individually for display in the interface 200. In this example, as illustration, frame 202-4 is selected and displayed in the interface 200. As shown, in frame 202-4, the 3D character 204 is in a squatting position and the scarf 206 is in a relatively at-rest position. As shown, the interface 200 may enable the user, e.g., an animator, to draw an arrow 208 to indicate how the user desires the scarf 206 to move during the animation sequence of the 3D character 204. During a next simulation of the animation sequence of the 3D character 204, one or more forces can be generated in accordance with the arrow 208 drawn by the user.

Various aspects of the arrow 208 may be manipulated by the user to specify different values of various parameters of the force (force parameters) to be generated for animating the scarf 206 during the next simulation pass. A given force parameter can indicate a measurable factor that can be used or referenced for generating the force specified by the user. For example, the direction of the arrow 208 can be used to specify a direction in which the force specified by the user can "pull" the scarf 206 during the next simulation pass. The length of the arrow 208 can be used to specify an area of the scarf 206 that may be "influenced" by the force(s) during the next simulation pass. For example, the longer the arrow 208 is drawn by the user, the more area on the scarf 206 may be "influenced" by the force to be generated according to the arrow 208. The user may be enabled to draw the arrow 208 in different widths, for example by directly adjusting a width of the arrow 208 after it is drawn or by specifying a width value through a field control such as the field control 214 indicating a width value of the arrow 208 as shown. The width of the arrow 208 may be used to specify an amount of strength of the force to be generated, and/or an area on the scarf 206 to be "influenced" by the force to be generated.

In some implementations, as shown in this example, the arrow 208 drawn by the user in the interface 200 may be three dimensional. For example, the user may be enabled to draw a "bent" or curved arrow 208, as shown in FIG. 2. In some embodiments, the direction of the forces applied to the scarf 206, as specified by the arrow 208, may be influenced by how bent the arrow is. For example, the direction of the force applied to a given particle of the scarf 206 may be chosen to be tangent with the part of the arrow 208 closest to this particle, and this tangent depends on how bent the arrow is.

The three-dimensional arrow 208 in some implementations may be used to generate one or more 3D forces for directing the movement of scarf 206 during the next simulation pass. The three-dimensional arrow 208 may also be manipulated by the user to be bent into various degrees. For example, as shown in this example, auxiliary lines 210 and 212 may be presented after the arrow 208 is drawn by the user to enable the user to bend arrow 208. For instance, the user may be enabled to "pull" the auxiliary line 210 up to bend arrow 208 with respect to a centroid 212 associated with the arrow 208. In some examples, the centroid 212 may be determined by the animation system automatically after the arrow 208 is drawn by the user. The bent degree of the arrow 208 may be used to generate a 3D force such that the 3D force can ""rotate" the influenced area on the scarf 206 according to bent degree of the arrow 208.

As also shown, in some implementations, an auxiliary arrow 216 can be provided by the user for indicating how an arrow 208 may be animated over the time—e.g., in a set of frames where the force as specified by the arrow is to take effect. As shown in this example, the auxiliary arrow 216 may be anchored with centroid 212 such that the arrow 208 may shift and/or bent with respect centroid 212 to change the position of the arrow 208 with respect to scarf 206 over the time. As will be described, the position of the arrow 208 with respect to scarf 206 can influence which area on the scarf 206 that may be influenced by the force to be generated according to arrow 208.

As still shown in FIG. 2, in some implementations, interface 200 may provide one or more fields 214 to enable a user to directly specify or modify various aspects regarding the arrow 208 and/or the force to be generated according to the arrow 208. For example, after the arrow 208 is drawn and manipulated by the user in interface 200 as described and illustrated above, a set of values may be interpolated for these aspects, such as force strength, arrow width, arrow direction, arrow bent degree, arrow length, and/or any other aspects. The interpolation may be based on the arrow drawn by the user, e.g., its length, width, direction and etc. These interpolated values may then be displayed through fields 214 in the interface 200 as shown. In some embodiments, the fields 214 can be text input fields and the user can be enabled to modify any one or ones of the values shown in fields 214 to "fine-tune" or change those values. These user modifiable values can then be used for generating the force(s) applied to the scarf 206 during the next simulation of the animation sequence of character 204.

Figure 3:
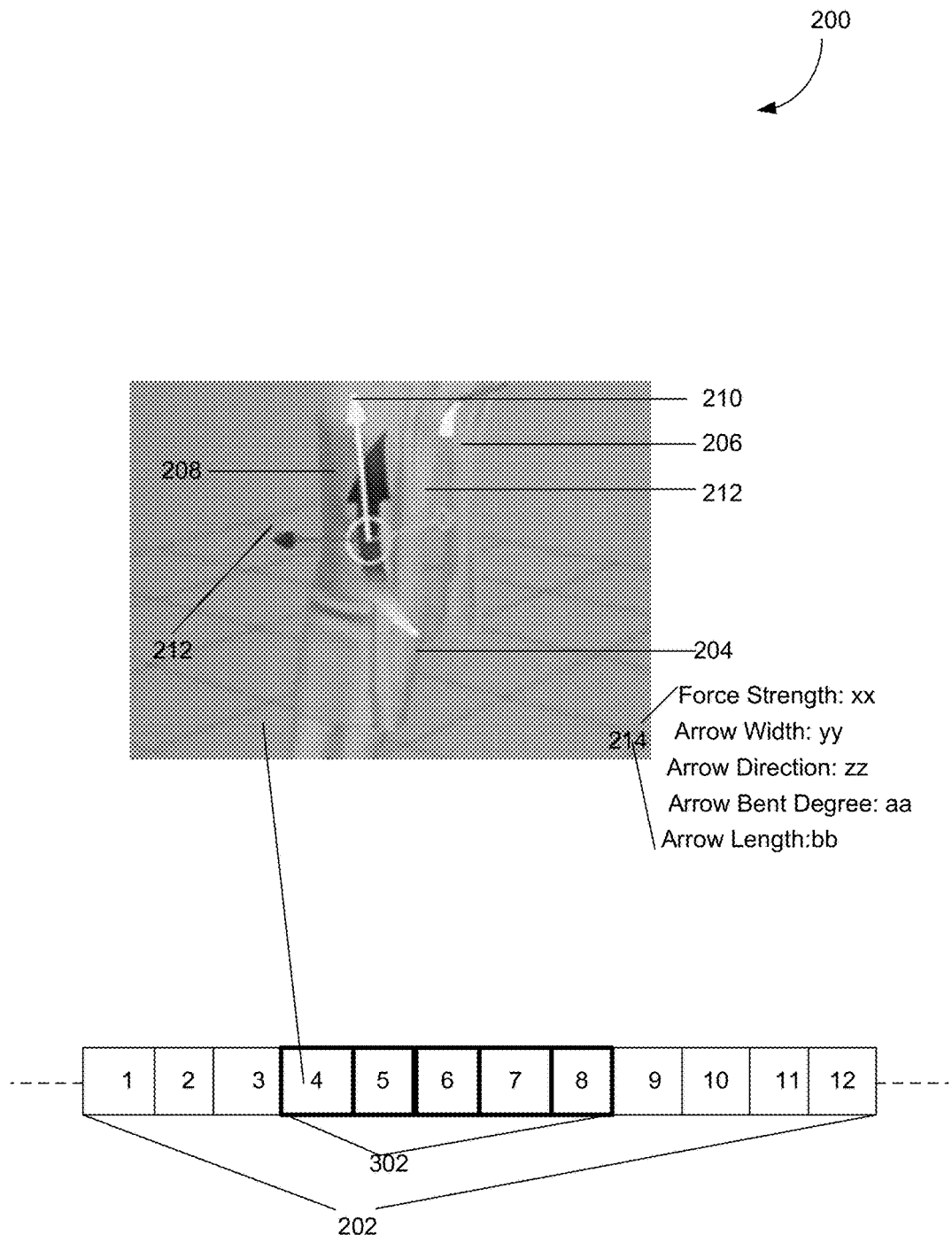
FIG. 3 illustrates enabling the user to select a subset of frames in the frame set shown in FIG. 2 such that movement direction as indicated by the arrow shown in FIG. 2 may be in effect only for the selected subset of frames.

In some implementations, the interface 200 may enable the user to select a subset of frames in the frame set 202 such that movement direction for the scarf 206 as indicated by arrow 208 may be in effect only for the selected subset of frames. This is illustrated in FIG. 3. As shown in FIG. 3, after the user draws the arrow 208 in the display of frame 202-4 in interface 200, the user may be enabled to select a subset of frames 302 from the frame set 202. For example, the user can be enabled to highlight (e.g., by holding down shift key) those frames for the selection. In the example shown in FIG. 3, the subset of frames 302 includes frames 202-4 to 202-8. Such a selection can be used to indicate to the animation system that the force to be generated in accordance with arrow 208 may only be in effect in frames 202-4 to 202-8 for the next simulation pass. That is, during those frames the force specified by the user through arrow 208 (as well as other forces) may be generated, and the force specified by the user through arrow 208 will not be generated in other frames, e.g., 204-1 to 204-3 and 204-9 to 204-12.

In some embodiments, after the subset of frames are selected by the user, the force specified by the user in the interface 200 may be dynamically generated during the subset of frames. For example, the strength of the user specified force may be generated dynamically during the subset of frames to smoothly ramp the force on and off In some embodiments, the arrow drawn by the user may be animated during the subset of frames. For example, the position and shape of the user provided arrow may change (automatically) during the subset of frames based on user specification and/or one or more predetermined factors, such as the position of the 3D character, the wind condition, some external forces in the scene and/or any other factors. In those embodiments, parameters of the force as specified the animated arrow can be interpolated based on the shape and position of the arrow during the subset of the frames

B. Force Generation

Generation of the force specified by the user through interface 200 as described above may be performed by an animation system, such as the system 100 described and illustrated here. For example, the force may be generated after the user clicks a button (not shown) provided in interface 200 to indicate so. Various methods may be used to generate the force specified by the user through interface 200. In general, the force generation can involve obtaining various metrics for the force to be generated and determining an area and/or points on the movable object (e.g., scarf 206) that may be "influenced" by the generated force.

Figure 4:
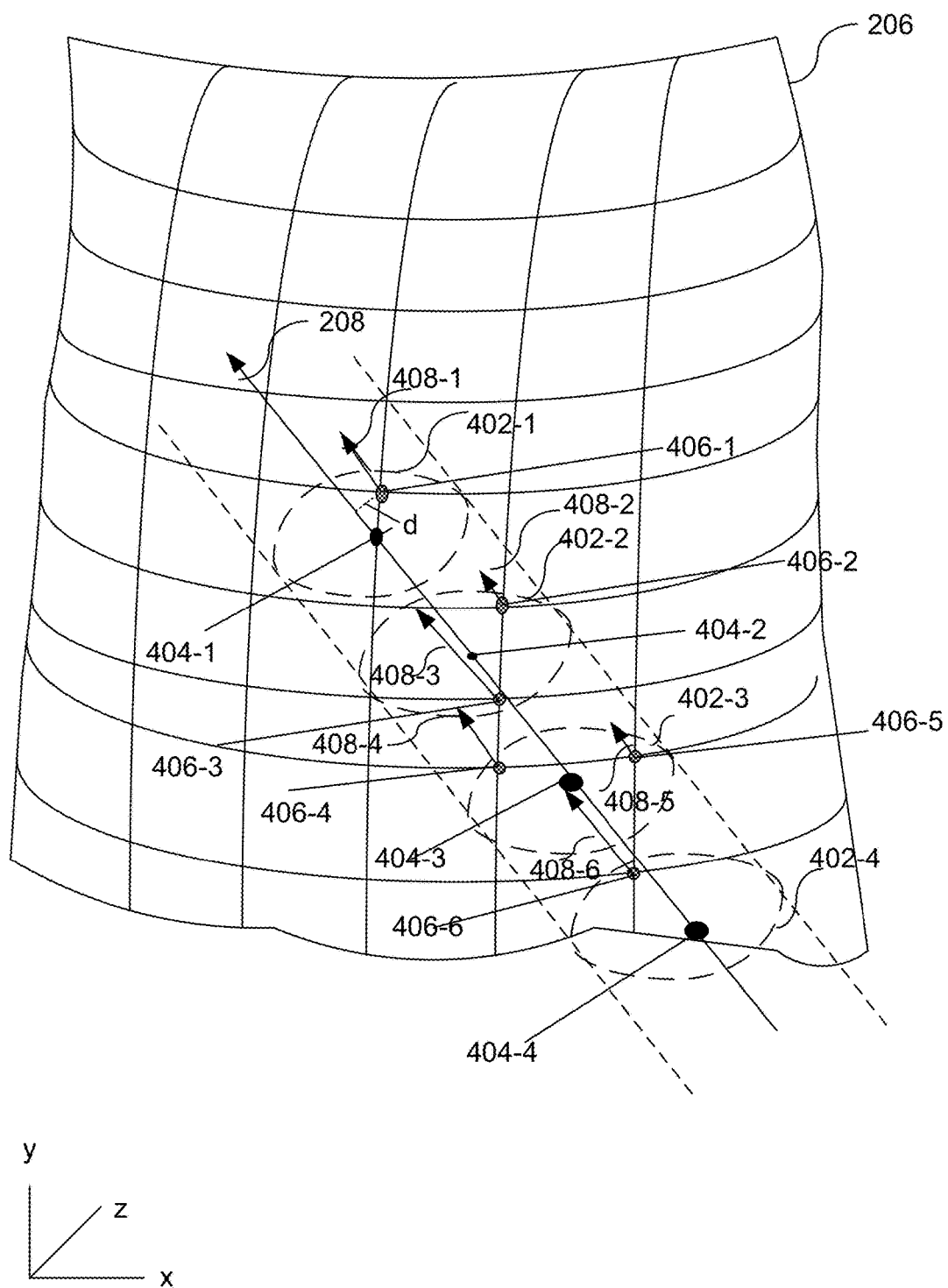
FIG. 4 illustrates one exemplary generation of the force specified by the user through the interface shown in FIG. 2.

The force generated according to the user input specified by the user through interface 200 may move (e.g., rotate, translate or scale,) one or more points, curves, surfaces, volumes, or combinations thereof in an affine, non-affine, or mixed manner. FIG. 4 illustrates one exemplary method for generating the force specified by the user through interface 200 as shown in FIG. 2. It will be described with reference to FIG. 2.

As shown, for generating the force, the scarf 206 may be divided into individual vertices or points, such as the vertex 406-1. The arrow 208 drawn by the user may be mapped to scarf 206 to determine one or more vertices on the scarf 206 that may be "influenced" by the force specified by the user through interface 200. That is, certain vertices on the scarf 206 may be mapped to the arrows 208 and selected for determining "influences" of the force specified by the user on the scarf 206. In some implementations, this may involve sampling points on the arrow 208 and map those points onto the scarf 206 for selecting the vertices. In this example, points 404 along the arrow 208, such as points 404-1 to 404-4 can be sampled. These points can be sampled arbitrarily along the arrow 208, and the number of points sampled may be based on the length of the arrow 208 as drawn by the user through interface 200. For instance, the number of sampled points 404 can increase as the length of arrow 208 increases. In that instance, the longer the arrow 208 is drawn by the user, the more points may be sampled. However, this is not intended to be limiting. In some other examples, the number of points sampled along the arrow 208 may not be based on the length of the arrow 208.

In various embodiments, the force may be generated based on proximity of the sampled points 404 on the arrow to corresponding vertices on the scarf. For example, a sphere 402 may be drawn for each of the sampled points 404. As shown, the sphere 402 may be drawn for the corresponding sampled point 404 by the corresponding sampled point 404 as the center of the sphere 402. In this example, sphere 402-1 is drawn for sampled point 404-1 such that sphere 402-1 centers on sampled point 404-1. Similarly, 402-2 to 402-4 are drawn in this example such that they center on sampled points 404-2 to 404-4, respectively.

After the spheres 402 are drawn, one or more vertices 406 on the scarf 206 may be identified such that that these vertices will be "influenced" by the force specified by the user through arrow 208 during the next simulation of the animation sequence of the 3D character 204. As shown, in this example, vertex 406-1 is identified as such a vertex because it is located within sphere 402-1. Similarly, vertices 406-2 and 406-3 are identified because they are located within sphere 402-2; vertices 406-4 and 406-5 are identified because they are located with sphere 402-3; and vertex 406-6 is identified because it is located within sphere 402-4.

It should be noted that the size of each sphere 402 drawn for the corresponding sampled point 404 may be predetermined or dynamically determined in various embodiments. For example, a predetermined radius may be employed for drawing the sphere 402. As another example, the size (e.g., radius) of the sphere 402 may depend on the width of the arrow 208 drawn by the user. For instance, as illustration, the size of the sphere 402 may increase as the width of the arrow 208 drawn by the user increases. As can be seen, the size of the sphere 402 can have an effect to the number of vertices 406 that may be "influenced". That is, a bigger sphere 402 may have more vertices 406 on the scarf 206 located within it than a smaller sphere 402. Accordingly, in that instance, the width of the arrow 208 can affect how big of an area or the number of vertices on the scarf 206 that may be "influenced" by the arrow 208.

For each individual vertex 406 that is identified as being located within a corresponding sphere 402, an individual force 408 may be determined such that the individual force may be applied to that vertex during the next simulation of the animation sequence of the 3D character 204. In this example, individual forces 408-1 to 408-6 are determined for each corresponding vertex 406. The generation of individual forces 408-1 to 408-6 can be based on a number of factors. As an example for vertex 406-1, which is located within sphere 402-1, individual force 408-1 can be determined for vertex 406-1.

It should be understood different functions may be used for generating the individual forces. For example, the individual forces may be generated as a function of distance between the sampled points 404 and the corresponding vertices 406, smoothed over time. In some embodiments, the forces to be applied on each vertex can be determined using a falloff function based on distance from the arrow 208. For example, the strength of the determined individual force 408-1 may be based on the strength of the force as specified by the user through interface 200 (e.g., through a corresponding field 214 shown FIG. 2) and a distance d of the vertex 406-1 to arrow 208 as shown. The distance d may be used to determine a factor that may be multiplied to the strength of the force as specified by the user. In some examples, the factor may be between 0 and 1. For example, as illustration, if the user specifies the force to be 5N (Newton), the distance d can then be used to determine a factor (e.g., 0.5) that is multiplied by the specific magnitude to obtain a final magnitude that is applied to vertex 406-1. The determination of the factor based on such a distance d can be implemented in a number of ways. For example, such a determination can be based on a formula that uses a coefficient such that the formula can determine a larger force for an individual vertex when the vertex is closer to the arrow 208, with the determined force being the force specified by the user when d is 0 (i.e. the vertex is one the arrow 208). In one embodiment, the individual force may be determined based on a smooth decaying function using the distance d as an input. As such, areas of the scarf 206 closer to the arrow 208 may experience greater force. Areas further from the arrow 208 may experience less of a force.

In some embodiments, the direction of the individual forces 408-1 to 408-6 may be consistent with the direction of arrow 208. In this example, the direction of the individual forces 408-1 to 408-6 is the direction of the arrow 208. As described above, in some embodiments, arrow 208 may be three-dimensional and in those embodiments, the direction of the individual forces 408-1 to 408-6 may also be three-dimensional accordingly. That is, in those embodiments, the individual forces 408 may be determined to have an effect on the corresponding vertices 406 three-dimensionally along the x, y, and z axis as shown in FIG. 4. As also described above, in some embodiments, the user may manipulate the three dimensional arrow 208 to specify a degree of bend to specify how much the force specified by the user may "twist" or "rotate" the cloth. In those embodiments, the individual forces may be determined three-dimensionally based on the degree of the bent specified by the user—e.g., the individual forces along the z axis through the scarf 206 can be determined based on the degree of bend of the arrow 208.

As described above, the generation of the individual forces to the selected vertices in accordance with arrow 208 may be dynamically implemented over the time. For example, when a subset of frames are selected by the user as illustrated in FIG. 3, the individual forces can be generated dynamically during the subset of frames. For example, the dynamic generation of the forces may involve animating (e.g. changing the position and/or shape of) the arrow 208 during the subset of frames. As illustration, the arrow 208 may be animated from frame to frame in the subset according to the position of the 3D character 204 during those frames. Based on the position and/or shape of the arrow 208 at a given frame in the subset, the selection of the vertices and individual forces to be applied to the selected vertices can be determined in a manner consistent with description provided above. In that sense, the generation of the individual forces is dynamic based on the arrow 208 drawn by the user. In one embodiment, various parameters of the individual forces to be applied to the selected vertices can be determined based on the shape and position of the arrow 208 at a given frame subset.

The simulation of the animation sequence of the character 204 may be performed by applying the determined individual forces 408 to corresponding vertex 406, and may include adding and/or modifying one or more simulation primitives and/or unified primitives. The simulation primitives may include one or more of bodies, colliders, and forces. U.S. patent application Ser. No. 13/042,275, incorporated by reference in its entirety, provides further detail regarding a system and methods for building and editing simulators based on simulation primitives and techniques for generating a simulator-independent application programming interface (API) for use in CGI and computer-aided animation.

C. An Exemplary Method for Enabling the Force Application Mode

Figure 5:
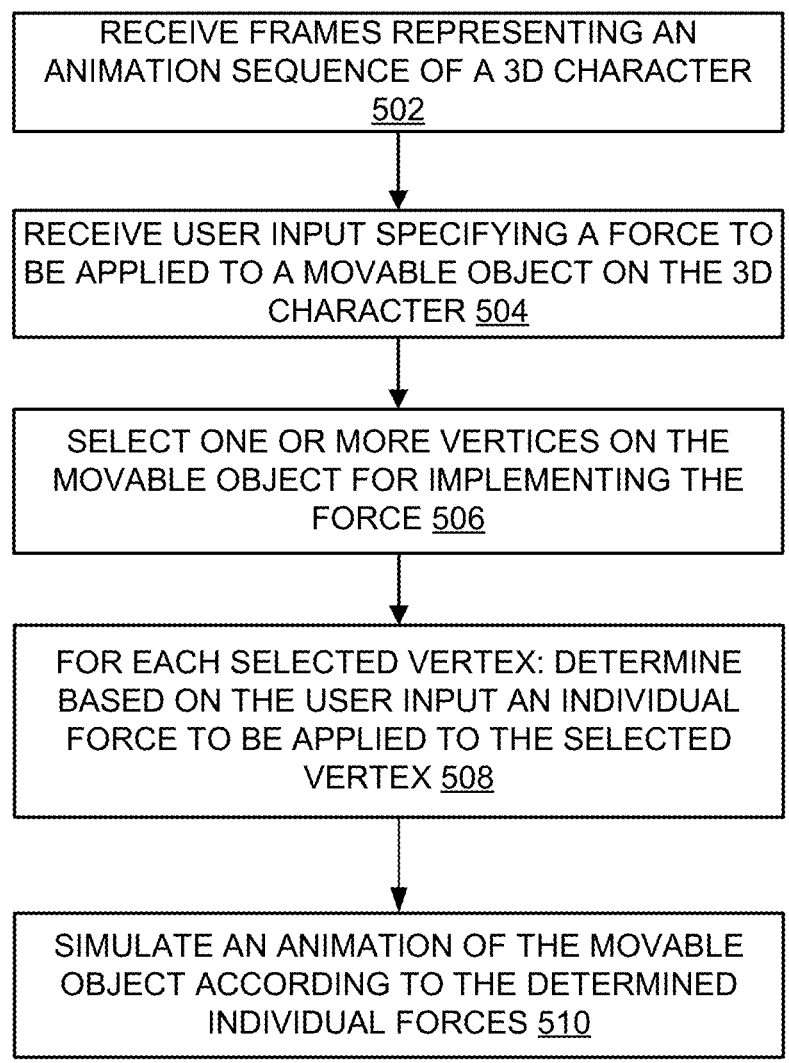
FIG. 5 is a flowchart of an exemplary method for enabling the force application model described and illustrated herein.

With the force application mode having been described and illustrated, attention is now directed to FIG. 5. FIG. 5 is a flowchart of an exemplary method for enabling the force application model described and illustrated herein. The method presented in FIG. 5 and described below is intended to be illustrative and non-limiting. The particular series of processing steps depicted in FIG. 5 is not intended to be limiting. It is appreciated that the processing steps may be performed in an order different from that depicted in FIG. 5 and that not all the steps depicted in FIG. 5 need be performed. In certain implementations, the method 500 may be generated by an animation system, such as the system 100 shown in FIG. 1.

In some embodiments, the method depicted in method 500 may be generated in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At 502, frames representing an animation sequence of a 3D character can be received. In the frames received at 502, the 3D character may carry a movable object and may be performing a motion. The movable object carried by the 3D character (e.g., the scarf 206 shown in FIG. 2) may or may not be moving. For example, the scarf 206 shown in FIG. 2 may be in at-rest position during the animation sequence received at 502 despite the 3D character 204 is performing a squatting motion. Of course, in some other examples, the scarf 206 may be moving but may be moving in a manner that needs further direction from a user, e.g., an animator.

At 504, a user input specifying a force to be applied to the movable object carried by the 3D character may be received. As described above, the user input received at 504 may be from an interface, such as interface 200 described and illustrated herein. The user input received at 504 may indicate a direction of the force, a strength of the force, a degree of a bent of the force, an area on the movable object that may be influenced by the force, and/or any other aspects of the force. In some implementations, the user input received at 504 may include an arrow drawn by the user in the interface. As mentioned above, in some embodiments, the arrow 208 provided by the user in the interface 200 may be animated over the time. That is, in those embodiments, once the arrow is provided by the user at 504, the arrow can be animated in accordance with user specification, and/or one or more predetermined factors such a position of the 3D character in frames where the force as specified by the arrow is to take effect.

At 506, one or more vertices on the movable object may be selected for generating the force specified the user received at 504. The selection of the vertices at 506 may be based on the user input received at 506. For example, as illustrated in FIG. 4, when the user input received at 504 includes an arrow, multiple points along the arrow may be sampled and the vertices on the movable object may be selected based on distances of the vertices to the arrow.

At 508, for each selected vertex, an individual force may be determined based on the user input received at 504 such that the individual force may be applied to the selected vertex during the next simulation of the animation sequence of the 3D character. For example, as illustrated in FIG. 4, when the user input received at 504 includes an arrow, the individual force determined at 508 may be based on a distance of the selected vertex to the arrow such that the closer the selected vertex is to the arrow, the stronger the individual force is determined for the selected vertex with the determined individual force being the force specified by the user when the selected vertex falls on the arrow.

At 510, an animation of the movable object may be simulated according to the individual forces determined at 508. In some implementations, the simulation of the animation of the movable object may be performed by applying the determined individual forces to corresponding vertex, and may include adding and/or modifying one or more simulation primitives and/or unified primitives. The simulation primitives may include one or more of bodies, colliders, and forces.

III. Silhouette Mode

Another aspect of the present disclosure is directed to enabling a user to specify a boundary or a silhouette stroke towards which a movable object, e.g., a piece of cloth worn by a 3D character may move during an animation sequence of the 3D character. Forces can be generated to cause the silhouette of the cloth to approach the silhouette stroke (i.e., a target silhouette desired by the user) drawn by the user. That is, in various examples, the vertices on the outside edge of the cloth can eventually lie along the silhouette stroke drawn by the user during the animation sequence. Vertices further inside the cloth however will not be pulled all the way to the silhouette stroke drawn by the user. For example, in a scene with a tablecloth and no character animation, the silhouette stroke can be drawn by the user to apply relatively small forces—applied to the points, to keep the cloth on the silhouette stroke. As another example, it is contemplated that the user can draw the silhouette stroke to direct or control how simulation of hairs of a 3D character or other simulated object (e.g., 3D muscles) may move during the animation sequence.

In various embodiments, an animation system, such as the system 100 described and illustrated herein may present a drawing tool to the user to enable the user to specify such a silhouette stroke. For example, the user may be enabled to interact with the input device to draw one or more desired silhouette strokes or strokes in a virtual user space including the 3D character model. The user may additionally associate the desired silhouette strokes with the cloth (or regions of the cloth). The desired silhouette strokes may be, for example, a curve or line that indicates a set of points towards which the cloth should move during animation (e.g., a simulation pass) over time. Upon inputting the silhouette strokes, a user may indicate that the 3D character should be animated. In response to the indication, the animation simulation system may move the areas of cloth associated with each silhouette stroke towards the desired silhouette stroke over time and present the animation to the user. In some embodiments, the user may be enabled to constrain (pin) the canvas containing the silhouettes to any object in the scene. For example, when the user specify a silhouette for the scarf worn by the 3D character, the silhouette can "follow" the scarf when the 3D character run through the scene.

A. Interface for Specifying a Silhouette Stroke

Figure 6:
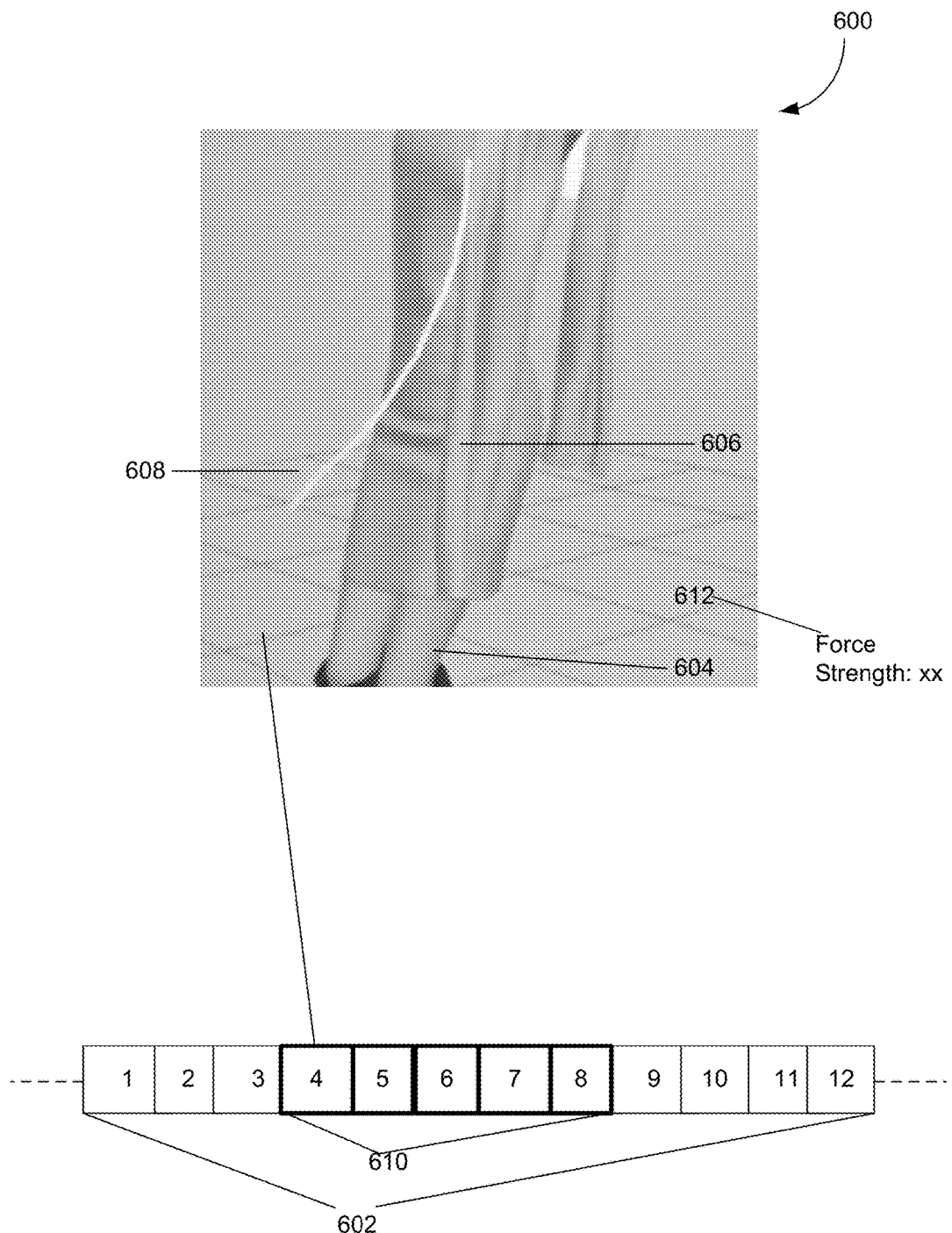
FIG. 6 illustrates an example interface that enables a user to specify a silhouette stroke for directing a movement of a movable object carried by a 3D character in accordance with the disclosure.

FIG. 6 illustrates an example interface 600 that enables a user to specify a silhouette stroke 608 for directing a movement of a movable object 606 carried by a 3D character 604 in accordance with the disclosure. In various embodiments, the interface 600 shown in FIG. 6 may be generated an animation simulation system the same as or substantially similar to the system 100 described and illustrated herein.

In various embodiments, the interface 600 may present a set of frames 602, such as frames 602-1 to 602-12 as shown in this example to the user. The set of frames 602 may represent an animation sequence of the 3D character 604. In this example, the 3D character 604 performs a squat motion such that the 3D character 604 bends her knees during the animation sequence. As described above, the animation sequence of the 3D character 604 as represented in the set of frames 602 may include a movement of the movable object 606, i.e., a piece of scarf in this example, simulated according to various factors such as gravity, kinetic motion of the 3D character 604 (i.e., squatting in this example), a particular wind condition when the 3D character 604 is performing the kinetic motion, and/or any other factors. It should be understood the movement of the movable object 606 in the animation sequence as represented in the set of frames 602 may have been simulated in accordance with user specified movement information previously provided through interface 600, e.g. a silhouette stroke, such as silhouette 608 shown in interface 600 and/or one or more silhouette strokes provided through interface 600 previously. For example, an animator may have already used interface 600 previously to direct the movement of the movable object 606 and the set of frames 602 were generated as a result of the direction by the animator.

As shown, the user may be enabled to select a particular frame, such as frame 602-4 for display in the interface 600. As also shown, after the frame 602-4 is displayed in the interface 600, the user may be enabled to draw a silhouette stroke 608 to indicate a boundary towards which scarf 606 may move during the next simulation of animation (e.g., a simulation pass) of the 3D character 604. In some implementations, the interface 600 may enable the user to select a subset of frames in the frame set 602 such that movement direction for the scarf 606 as specified by the silhouette stroke 608 may be in effect only for the selected subset of frames. As shown in FIG. 6, after the user draws silhouette stroke 608 in the display of frame 602-4 in interface 600, the user may be enabled to select a subset of frames 610 from the frame set 602. In the example shown in FIG. 6, the subset of frames 610 includes frames 602-4 to 602-8. Such a selection can be used to indicate to the animation simulation system that the force(s) to be generated in accordance silhouette stroke 608 may only be in effect in frames 602-4 to 602-8 for the next simulation of animation sequence of character 604.

In some embodiments, after the subset of frames are selected by the user, the force specified by the silhouette stroke 608 may be dynamically generated during the subset of frames. For example, the strength of the force may be generated dynamically during the subset of frames to smoothly ramp the force on and off. In some embodiments, the silhouette drawn by the user may be animated during the subset of frames. For example, the curve of the silhouette stroke 608 may change (automatically) during the subset of frames based on user specification and/or one or more predetermined factors, such as the position of the 3D character, the wind condition, collisions some external forces in the scene and/or any other factors. In those embodiments, parameters of the force as specified the animated silhouette stroke 608 can be interpolated based on the curve of silhouette stroke 608 during the subset of the frames B. Force Generation Generally, the animation simuation system, such as system 100 described and illustrated herein can receive, as input, the silhouette stroke 608 drawn via the user interface 600, and automatically maps points on the silhouette stroke 608 to verticies on the scarf 606 based on a set of distance criteria. Thereafter, the animation simulation system can apply one or more silhouette spring forces, which may include a damped spring force and/or a force generated according to any other algorithm, to "pull" the scarf 606 towards the mapped points on the silhouette stroke 608. In some embodiments, the scale of the force to be applied to the scarf 606 as it is moved towards the silhouette stroke 608 may be input by the user through an "amount" animation variable 612 in interface 600. In other embodiments, the animation simulation system may automatically determine the amount of force to be applied to the scarf 606 such that the scarf 606 is within a threshold proximity to the silhouette stroke at a particular point in time in the simulation input by the user.

Figure 7A:
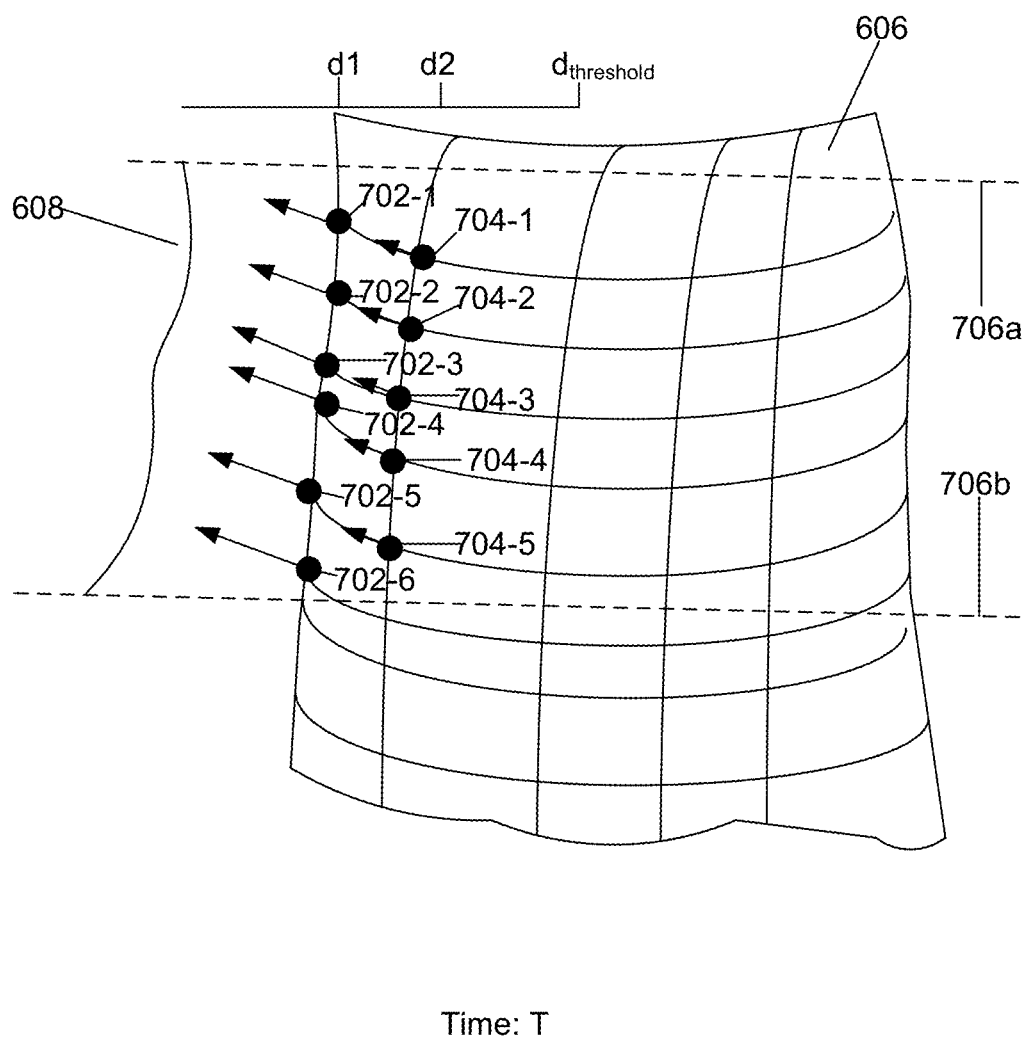
FIG. 7A illustrates an exemplary generation of damped spring forces in accordance with the silhouette stroke shown in FIG. 6 at a first time instance T during a next simulation of animation of the 3D character shown in FIG. 6.
Figure 7B:
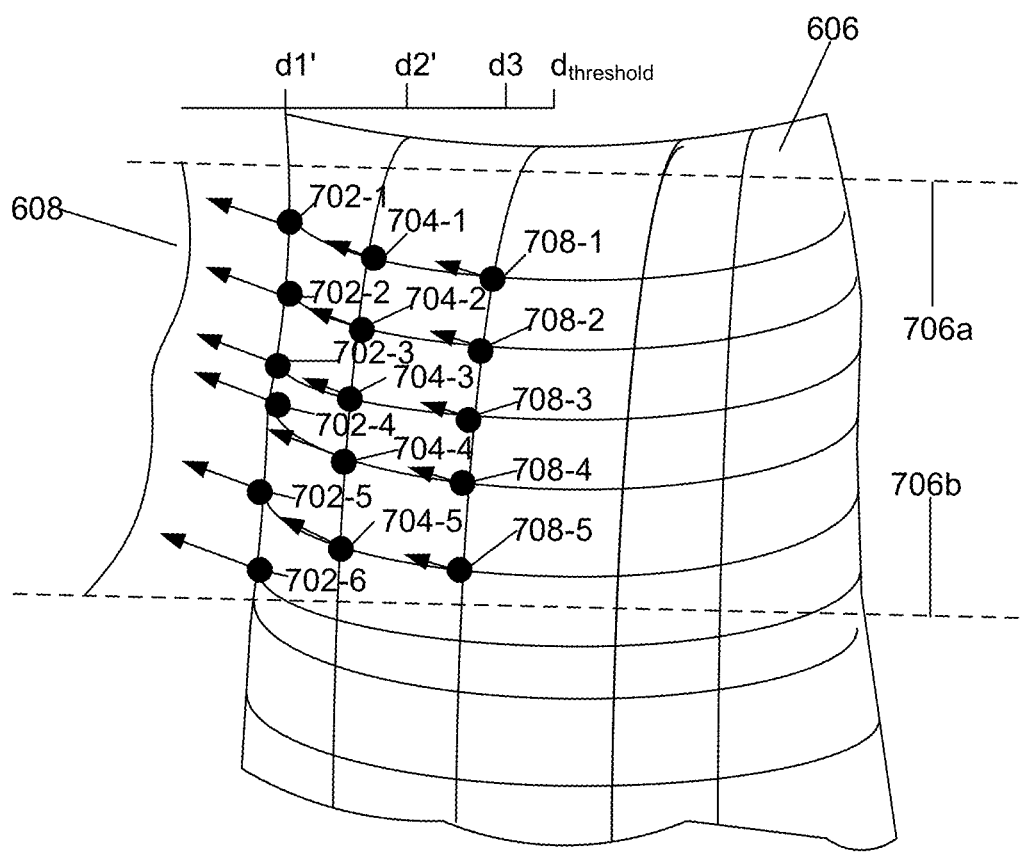
FIG. 7B illustrates an exemplary generation of damped spring forces in accordance with the silhouette stroke shown in FIG. 6 at a second time instance T+1 during a next simulation of animation of the 3D character shown in FIG. 6.

FIGS. 7A-B illustrate one exemplary generation of damped spring forces that may be generated according to the silhouette stroke 608 specified by the user through interface 600 as shown in FIG. 6. It will be described with reference to FIG. 6. FIG. 7A illustrates the generation of the damped spring forces at a first time instance T during the next simulation of animation of the 3D character 604. As shown, for generating the force, the scarf 606 may be divided into individual vertices or points, such as the vertex 702-1. The silhouette stroke 608 drawn by the user may be mapped to scarf 606 to determine one or more vertices on the scarf 606 that may be "influenced" by the silhouette stroke 608.

As shown, cut-off lines 706-a and 706-b may be determined to select vertices on the scarf 206 that may "influenced" by the silhouette stroke 608 such that only the vertices falling within the cut-off lines 706-a and 706-b may be considered for determining the damped spring forces. As also shown, for the vertices that fall within the cut-off lines 706a and 706b, a threshold distance may be used to further determine which of those vertices may be "influenced" the damped spring forces to be generated. As shown, the threshold distance $d_{threshold}$ may be a predetermined distance and may be compared with a distance of a given vertext to the silhouette stroke 608. In this example, vertices 702-1 to 702-6, and vertices 704-1 to 704-5 fall within the cut-off lines 706-a and 706b, and their distances to the silhouette stroke 608 are within the threshold distance $d_{threshold}$. As can be seen, for the force generation example shown in FIG. 7A, the length of silhouette stroke 608 and its distance to the scarf 606 as drawn by the user in interface 600 can affect the number of vertex on the scarf 606 that may be influenced by the damped spring forces.

After the individual vertices are selected, individual damped spring forces can be determined for applying to the selected vertices. In some implementations, as shown in FIG. 7A, the individual damped spring force determination for a given selected vertex may be based on the distance of the give selected vertex to the silhouette stroke 608. In this example, as shown, each of the vertices in 702-1 to 702-6 has a distance d1 to the silhouette stroke 608, and a damped spring force that can be generated for the each of these vertices can be based on d1. For example, it may be determined, based on the distance d1, a damped spring force of 4N may be applied to each of the vertices 702-1 to 702-6 at time T during the animation of 3D character 604. Similarly, each of the vertices 704-1 to 704-5 has a distance of d2 to the silhouette stroke 608 such that d2 is larger than d1. Accordingly, in this example, a damped spring force of 2N may be determined based on d2 for each of the vertices 704-1 to 704-5 such that 2N damped spring force may be applied to these vertices during the animation of 3D character 604 at time T.

FIG. 7B illustrates the generation of the damped spring forces at a second time instance T+1 during the next simulation of animation of the 3D character 604. As can be seen, due to the damped spring forces applied to scarf 606 at time T as shown in FIG. 7A, the scarf 606 is "pulled" closer to the silhouette stroke 608 at time T+1 in FIG. 7B. Time T+1 may represent a frame immediately after that shown in FIG. 7A. As a result of the pulling by the damped spring forces determined for time T, the distances d1' of vertices 702-1 to 702-6 to the silhouette stroke 608 are smaller than the respective distances d1 of those vertices. Based on such distances, appropriate forces can be generated over time to bring the scarf 606 to the silhouette stroke 608, and these forces will change from frame to frame.

Similarly, the distances d2' of vertices 704-1 to 704-5 to the silhouette stroke 608 also become smaller as compared to distance d2. As a result, stronger damped sprong force, for example 3N can be determined for each of there vertices 704-1 to 704-5 at time T+1. As also shown, due to the "pulling" by the damped spring forces determined for time T, the distance d3 of vertices 708-1 to 708-5 to the silhouette stroke 608 are within the threshold distance $d_{threshold}$. Accordingly, as shown, damped spring forces may be determined for those vertices at time T+1—for example, a 1N damped spring force may be applied to each of those vertices at time T+1 during the next simulation of the animation of character 604.

C. Method for Enabling the Silhouette Application Mode

Figure 8:
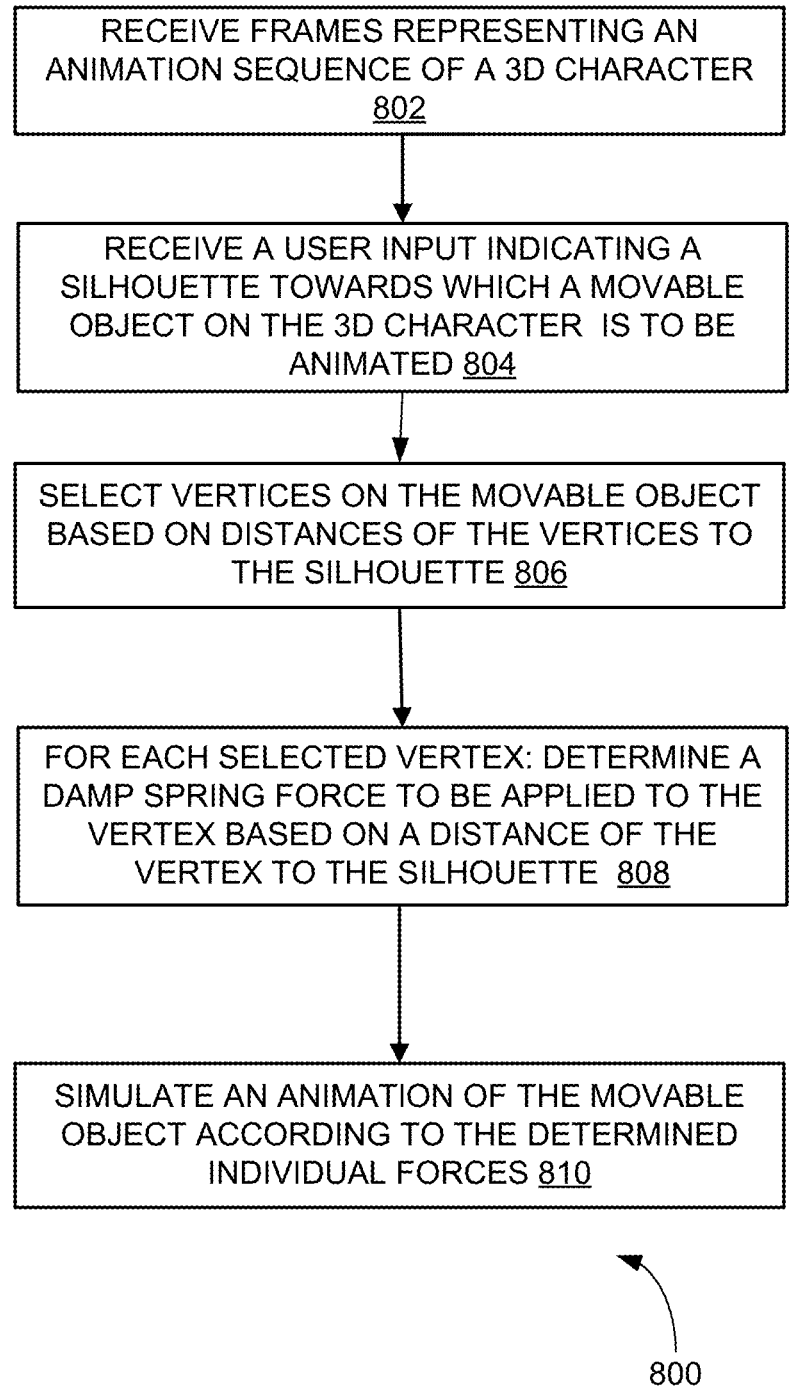
FIG. 8 is a flowchart of an exemplary method for enabling the silhouette application model described and illustrated herein.

With the silhouette mode having been described and illustrated, attention is now directed to FIG. 8. FIG. 8 is a flowchart of an exemplary method for enabling the silhouette application model described and illustrated herein. The method presented in FIG. 8 and described below is intended to be illustrative and non-limiting. The particular series of processing steps depicted in FIG. 8 is not intended to be limiting. It is appreciated that the processing steps may be performed in an order different from that depicted in FIG. 8 and that not all the steps depicted in FIG. 8 need be performed. In certain implementations, the method 800 may be generated by an animation system, such as the system 100 shown in FIG. 1.

In some embodiments, the method depicted in method 800 may be generated in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At 802, frames representing an animation sequence of a 3D character can be received. In the frames received at 802, the 3D character may carry a movable object and may be performing a motion. The movable object carried by the 3D character (e.g., the scarf 606 shown in FIG. 6) may or may not be moving. For example, the scarf 606 shown in FIG. 6 may be in at-rest position during the animation sequence received at 802 despite the 3D character 604 is performing a squatting motion. Of course, in some other examples, the scarf 606 may be moving but may be moving in a manner that needs further direction from a user, e.g., an animator.

At 804, a user input indicating a silhouette stroke may be received. The silhouette stroke received at 804 may indicate a a boundary towards which the movable object carried by the 3D character may be pulled during the next simulation of the animation of the 3D character. As described above, the silhouette stroke received at 804 may be from an interface, such as interface 600 described and illustrated herein. As mentioned above, in some embodiments, the silhouette stroke 608 provided by the user in the interface 600 may be animated over the time. That is, in those embodiments, once the silhouette stroke is provided by the user at 804, the silhouette stroke can be animated in accordance with user specification, and/or one or more predetermined factors such a position of the 3D character in frames where the force as specified by the silhouette stroke is to take effect.

At 806, one or more vertices on the movable object may be selected based distances of the vertices to the silhouette stroke received at 804. The selection of the vertices at 806 may be based a length of silhouette stroke received at 804 and a predetermined threshold distance. For example, as illustrated in FIG. 7A, a set of vertices, such as vertices 702-1 to 702-6 may be selected based on the distances of those vertices are smaller than the threshold distance.

At 808, for each vertex selected at 806, a damped spring force may be determined based on the distance of the selected vertex to the silhouette stroke received at 804. As illustrated in FIG. 7A, a stronger damped spring force may be determined for those selected vertices that have a shorter distance to the silhouette stroke received at 804 than those having a longer distance to the silhouette stroke received at 804. The damped spring forces determined for the selected vertices can be applied to the selected vertices during the next simulation of the animation of the 3D character such that those vertices will be "pulled" towards the silhouette stroke received at 804 during the next simulation of the animation of the 3D character.

At 810, an animation of the movable object may be simulated according to the damped spring forces determined at 810. In some implementations, the simulation of the animation of the movable object may be performed by applying the determined individual forces to corresponding vertex, and may include adding and/or modifying one or more simulation primitives and/or unified primitives. The simulation primitives may include one or more of bodies, colliders, and forces.

IV. A Mixed Mode

In some embodiments, the animation system, such as system 100 described and illustrated herein may be generated to enable a user to direct a movable object carried by a 3D character during an animation sequence of the 3D character using the direct force specification and silhouette stroke described above.

Figure 9:
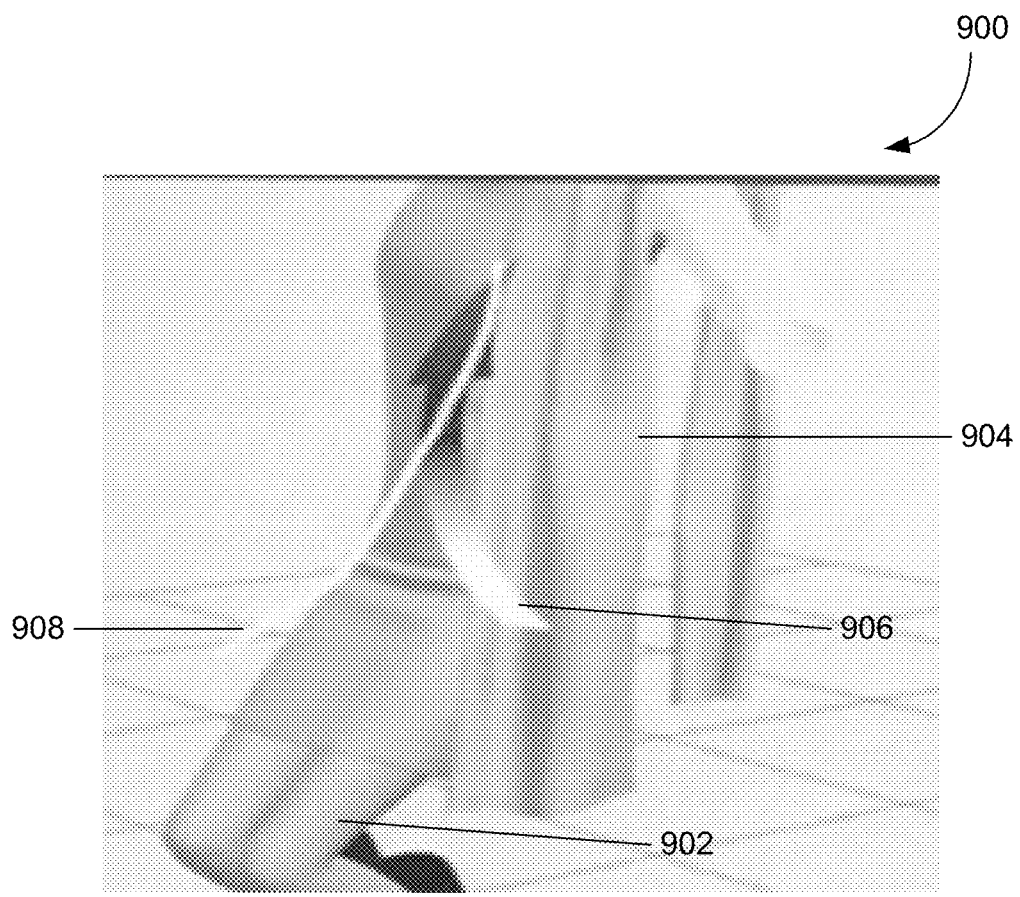
FIG. 9 illustrates an interface may be presented to the user such that user is enabled to draw an arrow to specify a force and a silhouette for directing a scarf worn the 3D character.

FIG. 9 illustrates an interface 900 may be presented to the user such that user is enabled to draw an arrow to specify a force and a silhouette for directing a scarf worn the 3D character. As shown, through the interface 900, the user may be enabled to draw an arrow 906 much like the arrow 208 as illustrated in FIG. 2. And, the user can draw a silhouette stroke 908 for directing the scarf 904 worn by the 3D character 902. In those embodiments, individual forces may be determined based on the arrow 906 as illustrated and described herein and damped spring forces may be determined based on the silhouette stroke 908 as described and illustrated herein. In those embodiments, both the determined individual forces and damped spring forces can be applied to corresponding verices during the next simulation of the animation of the 3D character 902. In some embodiments, multiple of silhouette stroke 908 and/or multiple of arrow 906 may be drawn by the user in interface 900 to influence the movement of the scarf 906.

V. Computer System

Figure 10:
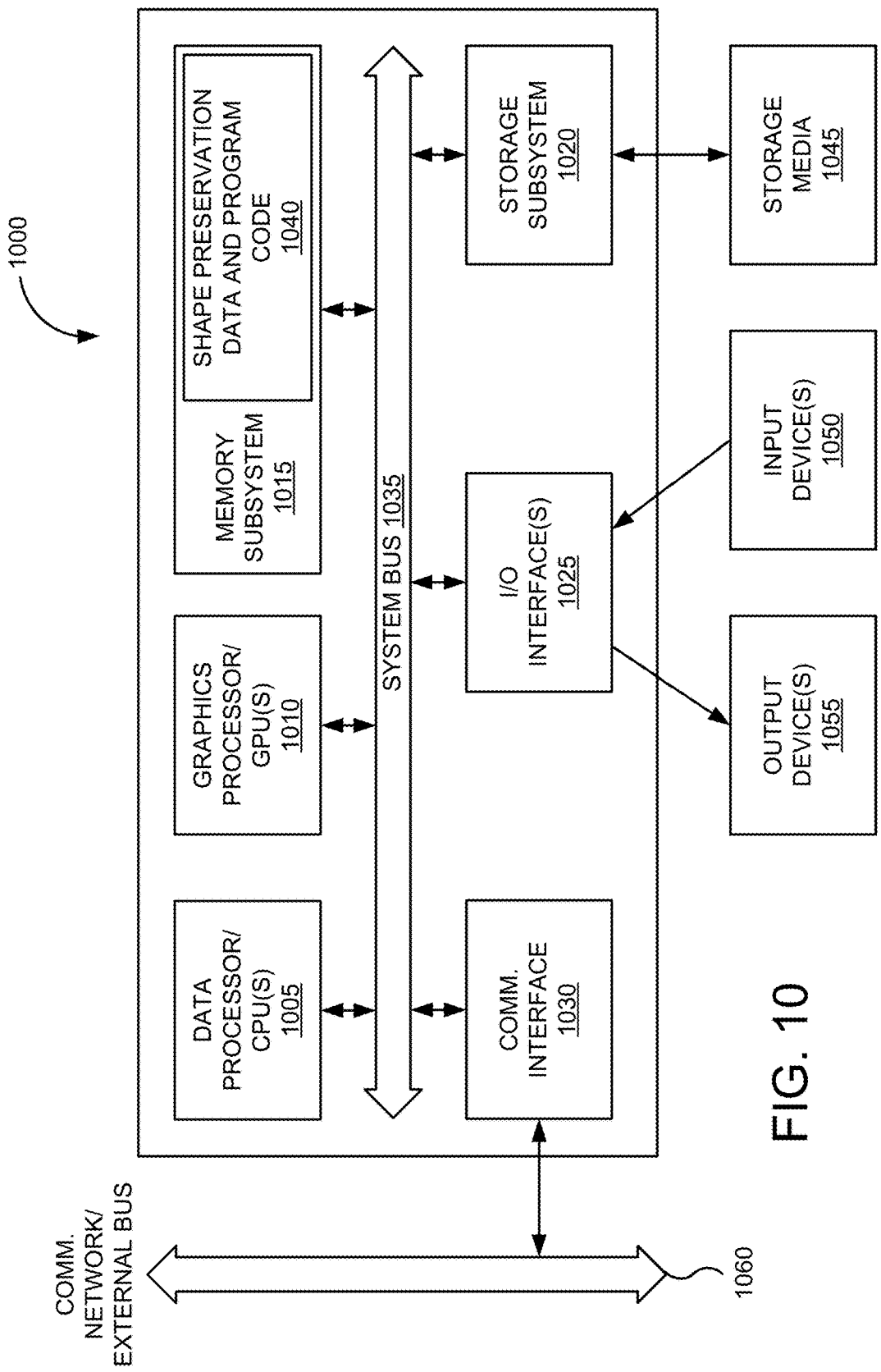
FIG. 10 is a block diagram of computer system 1000 that may incorporate an embodiment, be incorporated into an embodiment, or be used to practice any of the innovations, embodiments, and/or examples found within this disclosure

FIG. 10 is a block diagram of computer system 1000 that may incorporate an embodiment, be incorporated into an embodiment, or be used to practice any of the innovations, embodiments, and/or examples found within this disclosure. FIG. 10 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1000 can include hardware and/or software elements configured for performing logic operations and calculations, input/output operations, machine communications, or the like. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication. Computer system 1000 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1005 can include hardware and/or software elements configured for executing logic or program code or for providing application-specific functionality. Some examples of CPU(s) 1005 can include one or more microprocessors (e.g., single core and multi-core) or micro-controllers. CPUs 1005 may include 4-bit, 8-bit, 12-bit, 10-bit, 32-bit, 64-bit, or the like architectures with similar or divergent internal and external instruction and data designs. CPUs 1005 may further include a single core or multiple cores. Commercially available processors may include those provided by Intel of Santa Clara, Calif. (e.g., x86, x86_64, PENTIUM, CELERON, CORE, CORE 12, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 1005 may also include one or more field-gate programmable arrays (FPGAs), application-specific integrated circuits (ASICs), or other microcontrollers. The one or more data processors or central processing units (CPUs) 1005 may include any number of registers, logic units, arithmetic units, caches, memory interfaces, or the like. The one or more data processors or central processing units (CPUs) 1005 may further be integrated, irremovably or moveably, into one or more motherboards or daughter boards.

The one or more graphics processor or graphical processing units (GPUs) 1010 can include hardware and/or software elements configured for executing logic or program code associated with graphics or for providing graphics-specific functionality. GPUs 1010 may include any conventional graphics processing unit, such as those provided by conventional video cards. Some examples of GPUs are commercially available from NVIDIA, ATI, and other vendors. In various embodiments, GPUs 1010 may include one or more vector or parallel processing units. These GPUs may be user programmable, and include hardware elements for encoding/decoding specific types of data (e.g., video data) or for accelerating 12D or 13D drawing operations, texturing operations, shading operations, or the like. The one or more graphics processors or graphical processing units (GPUs) 1010 may include any number of registers, logic units, arithmetic units, caches, memory interfaces, or the like. The one or more data processors or central processing units (CPUs) 1005 may further be integrated, irremovably or moveably, into one or more motherboards or daughter boards that include dedicated video memories, frame buffers, or the like.

Memory subsystem 1015 can include hardware and/or software elements configured for storing information. Memory subsystem 1015 may store information using machine-readable articles, information storage devices, or computer-readable storage media. Some examples of these articles used by memory subsystem 1070 can include random access memories (RAM), read-only-memories (ROMS), volatile memories, non-volatile memories, and other semiconductor memories. In various embodiments, memory subsystem 1015 can include shape preservation data and program code 1040.

Storage subsystem 1020 can include hardware and/or software elements configured for storing information. Storage subsystem 1020 may store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMS, DVDs and bar codes, removable storage devices, networked storage devices, or the like. In some embodiments, all or part of shape preservation data and program code 1040 may be stored using storage subsystem 1020.

In various embodiments, computer system 1000 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 1000 may also include one or more applications configured to execute, perform, or otherwise generate techniques disclosed herein. These applications may be embodied as shape preservation data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

The one or more input/output (I/O) interfaces 1025 can include hardware and/or software elements configured for performing I/O operations. One or more input devices 1050 and/or one or more output devices 1055 may be communicatively coupled to the one or more I/O interfaces 1025.

The one or more input devices 1050 can include hardware and/or software elements configured for receiving information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can include hardware and/or software elements configured for outputting information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements.

A display device or monitor may be used with computer system 1000 and can include hardware and/or software elements configured for displaying information. Some examples include familiar display devices, such as a television monitor, a cathode ray tube (CRT), a liquid crystal display (LCD), or the like.

Communications interface 1030 can include hardware and/or software elements configured for performing communications operations, including sending and receiving data. Some examples of communications interface 1030 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1030 may be coupled to communications network/external bus 1080, such as a computer network, to a FireWire bus, a USB hub, or the like. In other embodiments, communications interface 1030 may be physically integrated as hardware on a motherboard or daughter board of computer system 1000, may be generated as a software program, or the like, or may be generated as a combination thereof.

In various embodiments, computer system 1000 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1000.

As suggested, FIG. 10 is merely representative of a general-purpose computer system appropriately configured or specific data processing device capable of generating or incorporating various embodiments of an invention presented within this disclosure. Many other hardware and/or software configurations may be apparent to the skilled artisan which are suitable for use in generating an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as generated upon a chip or an auxiliary processing board.

Various embodiments of any of one or more inventions whose teachings may be presented within this disclosure can be generated in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for generating in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for animating a three-dimensional (3D) character, the method being performed by one or more computer systems, the method comprising:
   receiving a plurality of frames representing an animation sequence of the 3D character, the 3D character having a piece of cloth thereon;
   dividing the piece of cloth into a set of vertices such that the piece of cloth may be animated through the set of vertices;
   displaying a frame of the plurality of frames on a display, the frame including the 3D character and the piece of cloth;
   receiving a user input including an arrow drawn on the display, the arrow indicating a direction of movement of at least a portion of the piece of cloth in the animation sequence, the user input specifying a total force to be applied to the piece of cloth during the animation sequence of the 3D character;
   generating the total force as specified by the user input for animating the piece of cloth during the animation sequence of the 3D character, wherein the generation of the total force comprises:
      selecting, based on the user input and the arrow, one or more vertices on the piece of cloth for applying the total force as specified by the user input; and
      for each selected vertex:
         determining a distance between the selected vertex and the arrow;
         determining a strength of a virtual force to be applied to the selected vertex based on the user input and the distance; and
      simulating, according to the virtual force for each selected vertex, an animation of the piece of cloth during the animation sequence of the 3D character.

2. The method of claim 1, wherein the arrow is three dimensional such that at least a portion of the arrow is curved, and the curved portion indicates directions of virtual forces to be applied to vertices proximate to the curved portion.

3. The method of claim 1, further comprising animating the arrow over a time period to interpolate one or more force parameters for the total force over the time period, wherein the one or more force parameters indicate one or more measurable factors for generating the total force.

4. The method of claim 1, further comprising enabling a user to select a subset of the received frames such that the total force as specified by the user input is to be applied to the piece of cloth during the selected subset of the received frames.

5. The method of claim 4, wherein the generation of the total force is dynamic such that the generated total force changes during the subset of the received frames.

6. A method for animating a three-dimensional (3D) character, the method being performed by one or more computer systems, the method comprising:
   receiving a plurality of frames representing an animation sequence of the 3D character, the 3D character having a piece of cloth thereon;
   dividing the piece of cloth into a set of vertices such that the piece of cloth may be animated through the set of vertices;
   displaying a frame of the plurality of frames on a display, the frame including the 3D character and the piece of cloth;
   receiving a user input including an arrow drawn on the display, the arrow indicating a direction of movement of at least a portion of the piece of cloth in the animation sequence, the user input specifying a total force to be applied to the piece of cloth during the animation sequence of the 3D character;
   generating the total force as specified by the user input for animating the piece of cloth during the animation sequence of the 3D character, wherein the generation of the total force comprises:
      sampling one or more points along the arrow;
      selecting one or more vertices on the piece of cloth based on the one or more points sampled; and
      for each selected vertex:
         determining, based on the user input and the arrow, a virtual force to be applied to the selected vertex during the animation sequence of the 3D character; and
      simulating, according to the virtual force for each selected vertex, an animation of the piece of cloth during the animation sequence of the 3D character.

7. The method of claim 6, wherein the selection of the one or more vertices comprises:
   for each sampled point of the one or more sampled points, defining an area on the piece of cloth based on the sampled point; and
   for each defined area, selecting one or more vertices within the defined area.

8. The method of claim 7, wherein the one or more vertices selected lie on an outer edge of the defined area.

9. A method for animating a 3D character, the method being performed by one or more computer systems, the method comprising:
- receiving a plurality of frames representing an animation sequence of the 3D character, the 3D character having a piece of cloth thereon, the piece of cloth being dividable into a set of vertices such that the piece of cloth is animatable through the set of vertices;
- displaying a frame of the plurality of frames on a display, the frame including the 3D character and the piece of cloth;
- receiving a user input including a drawing of a silhouette stroke on the display with respect to the piece of cloth, the silhouette stroke indicating towards which at least a portion of the piece of cloth is to move during the animation sequence;
- generating virtual forces according to the silhouette stroke for animating the piece of cloth during the animation sequence, wherein the generation of the virtual forces comprises:
  - selecting vertices on the piece of cloth based on distances of the vertices to the silhouette stroke; and
  - for each selected vertex:
    - determining a virtual force to be applied to the selected vertex based on a distance of the selected vertex to the silhouette stroke; and
- simulating, according to the generated virtual forces, an animation of the piece of cloth.

10. The method of claim 9, further comprising receiving a subset of the plurality of frames from a user;
- wherein the selection of the vertices and the determination of the virtual force for each selected vertex is performed for each frame in the subset.

11. The method of claim 10, wherein the generation of the virtual forces is dynamic such that the generated virtual forces change during the subset of the plurality of frames.

12. The method of claim 9, wherein the selection of the vertices includes comparing the distances of the vertices to the silhouette stroke with a threshold distance.

13. The method of claim 9, wherein the determined virtual force for each selected vertex is a damped spring force that pulls the selected vertex towards the silhouette stroke.

14. The method of claim 9, further comprising animating the silhouette stroke over a time period to interpolate one or more force parameters for the virtual forces over the time period, wherein the one or more force parameters indicate one or more measurable factors for generating the virtual forces.

15. A computer product comprising a non-transitory computer readable medium storing a plurality of instructions that when executed control a computer system to animating a three-dimensional (3D) character, the instructions comprising:
- receiving a plurality of frames representing an animation sequence of the 3D character, the 3D character having a piece of cloth thereon;
- dividing the piece of cloth into a set of vertices such that the piece of cloth may be animated through the set of vertices;
- displaying a frame of the plurality of frames on a display, the frame including the 3D character and the piece of cloth;
- receiving a user input including a graphical indication on the display indicating a direction of movement of at least a portion of the piece of cloth in the animation sequence, the user input specifying a total force to be applied to the piece of cloth during the animation sequence of the 3D character;
- generating the total force as specified by the user input for animating the piece of cloth during the animation sequence of the 3D character, wherein the generation of the total force comprises:
- sampling one or more points according to the graphical indication;
- selecting, based on the one or more points sampled, one or more vertices on the piece of cloth for applying the total force as specified by the user input; and
- for each selected vertex:
  - determining, based on the user input and the graphical indication, a virtual force to be applied to the selected vertex during the animation sequence of the 3D character; and
- simulating, according to the generated virtual force, an animation of the piece of cloth during the animation sequence of the 3D character.

16. The computer product of claim 15, wherein the graphical indication of the user input includes an arrow drawn on the display, wherein a direction of the arrow indicates the direction of movement of the portion of the piece of cloth in the animation sequence.

17. The computer product of claim 16, wherein the arrow is three dimensional such that at least a portion of the arrow is curved, and the curved portion indicates directions of virtual forces to be applied to vertices proximate to the curved portion.

* * * * *